United States Patent
Ratnakar (10) Patent No.: US 7,535,367 B2
(45) Date of Patent: May 19, 2009

(54) AIRPLANE LAVATORY RESERVATION SYSTEM

(76) Inventor: Nitesh Ratnakar, 8600 S. Liberty La., #2410, Oak Creek, WI (US) 53154

( * ) Notice: Subject to any disclaimer, the term of this patent is extended or adjusted under 35 U.S.C. 154(b) by 161 days.

(21) Appl. No.: 11/308,618

(22) Filed: Apr. 12, 2006

(65) Prior Publication Data
US 2007/0241927 A1 Oct. 18, 2007

(51) Int. Cl.
G08B 23/00 (2006.01)
(52) U.S. Cl. .............. 340/573.1; 340/825.28; 340/825.29; 705/5; 705/6
(58) Field of Classification Search ........... 340/945, 340/573.1, 825.28, 539, 540, 531; 705/5, 705/6, 5.5; 244/129.5, 118.5, 129.4, 121; 701/201; 707/100; 395/205
See application file for complete search history.

(56) References Cited

U.S. PATENT DOCUMENTS

| | | | | |
|---|---|---|---|---|
| 4,961,177 A | * | 10/1990 | Uehara | 704/272 |
| 5,850,753 A | * | 12/1998 | Varma | 70/278.7 |
| 6,237,872 B1 | * | 5/2001 | Bar-Levav | 244/118.6 |
| 6,329,919 B1 | * | 12/2001 | Boies et al. | 340/573.1 |
| 7,016,842 B2 | * | 3/2006 | Mills | 704/270 |
| 2002/0022896 A1 | * | 2/2002 | Dugan | 700/83 |
| 2002/0133725 A1 | * | 9/2002 | Roy et al. | 713/202 |
| 2004/0055345 A1 | * | 3/2004 | Moore | 70/257 |
| 2005/0146419 A1 | * | 7/2005 | Porter | 340/5.73 |

* cited by examiner

Primary Examiner—Davetta W Goins
Assistant Examiner—Hoi C Lau (57) ABSTRACT

The present invention is an apparatus, system, and method for providing reservations for lavatory use in airplanes. In one embodiment, a passenger on an airplane may submit a lavatory reservation request to the system. The reservation system assigns an access code to the passenger making the lavatory reservation request. The reservation system reserves a lavatory for a passenger when his or her request can be accommodated according to set of rules; and notifies the passenger when a lavatory has been reserved for him or her. Passengers are required to enter their assigned access code into the reservation system when it is their turn to use a lavatory. An input means is provided at lavatory doors for this purpose. Each lavatory door has a lock with means to restrict access to the lavatory only to authorized passengers with a valid access code; and only when it is a passenger's turn to use the lavatory. The system improves airline safety; passenger convenience and passenger comfort by minimizing the time passengers spend standing outside a lavatory while an airplane is in flight. The present invention can also be used in other forms of public transport such as trains, buses, boats etc.; and at places of public gathering with limited lavatory availability such as theaters, restaurants, stadiums etc.

18 Claims, 5 Drawing Sheets

AIRPLANE LAVATORY RESERVATION SYSTEM

FIELD OF THE INVENTION

The present invention relates to an apparatus, system and method of reserving lavatory on a 'first come first serve' basis in public transport means such as an airplane; while passengers stay comfortably seated in their respective seats until a lavatory becomes available for their use. This obviates the need for passengers to stand and wait in line outside lavatories for long periods of time.

BACKGROUND & PRIOR ART

It is a common occurrence in airplanes for passengers to stand and wait outside airplane's lavatories for long periods of time. This practice is common in long distance international flights where most passengers need to use the lavatory at one time or another. This is especially problematic in the morning hours when many passengers need to use lavatory at the same time. Many passengers find standing outside a lavatory to be an unpleasant and embarrassing experience. This is especially true for female passengers and young children. It is problematic for children as they are not accustomed to standing and waiting for long periods to use the lavatory. In addition, passengers standing outside a lavatory cause inconvenience to passengers occupying seats that are in close proximity to the lavatory. This practice invades the privacy and personal space of these passengers. Sometimes, passengers standing outside a lavatory engage in loud conversations, which is very disturbing to the passengers occupying seats in proximity to the lavatory. Sometimes, passengers waiting outside a lavatory block the view of television screen for passenger sitting behind them. On occasion, arguments and even fights occur among passengers over the issue of who is first in line to use a lavatory. This truly is an uncivilized way to use lavatory in a technologically advanced machine such as an airplane. As a result, seats close to the lavatories are undesired and are often shunned by passengers at the time of seat allocation. At times, when a large number of passengers stand and wait outside a lavatory, it becomes a safety issue on two accounts; 1) passengers do not have seat belts on during this time and are hence vulnerable to falling and sustaining injuries in case of turbulence; and 2) if a large number of passengers stand on one side of the airplane, there is a potential for causing unequal distribution of weight and consequently endanger the stability of the airplane.

OBJECTS OF THE INVENTION

Accordingly, the object of the invention is to provide an apparatus; system and method to enable passengers in an airplane reserve a lavatory for their use on a 'first come first serve' basis while remaining comfortably seated in their seats; thus obviating the need to stand in line outside a lavatory for long periods of time. Another object of the invention is to minimize the wait time for passengers to use a lavatory. Yet another object of the invention is to enhance the safety and security of airplane.

SUMMARY OF THE INVENTION

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out one or several purposes of the present invention. It is important, therefore, that the claims be regarded as including such equivalent constructions insofar as they do not depart from the spirit and scope of the present invention.

A lavatory reservation apparatus, method and system is provided with the aim of providing airline passengers means to reserve a lavatory on a 'first come first serve basis'; while remaining seated in their respective seats. The lavatory reservation apparatus comprises of a; 1) lavatory reservation console; 2) lavatory door lock; 3) lavatory status module; and 4) central computer system; furthermore all systems and apparatuses are networked to the 'central computer system' by wired or wireless network. 'Lavatory reservation console' is installed at all passenger seats and comprises of an input means, such as an electronic display unit, to enable passengers enter lavatory reservation request. An access code is generated in response to each lavatory reservation request. 'Lavatory reservation console' is also provided with means to communicated access code and reservation status to passengers. Airplane lavatory doors are enabled with a 'lavatory door lock', preferably having means for automatic operation by the 'central computer system'. A 'lavatory status module' comprising of data input means is provided at the lavatory door for passengers to enter their access code and to update the occupancy status of the lavatory. The 'central computer system' serves as a central controller and is enabled with an operating system and 'lavatory reservation software' with executable program codes to; 1) accept lavatory reservation requests from passengers via the 'lavatory reservation module' and generate an access code in response to each lavatory reservation request; 2) determine lavatory occupancy status via the 'lavatory status module' and the 'lavatory door lock'; 3) reserve available lavatory to passengers in the order their reservation requests; 4) notify passengers when a lavatory has been reserved for them; 5) receive and verify access codes entered at the 'lavatory status module'; and 6) operate 'lavatory door lock' automatically to restrict access to the lavatory. The operation of the 'lavatory door lock' is programmed in a way that it restricts access to a lavatory only to authorized passengers with a verifiable access code at a time when the said lavatory is reserved for their use. The system improves airline safety; passenger convenience and passenger comfort by minimizing the time passengers spend standing and waiting outside a lavatory.

DETAILED DESCRIPTION OF THE DRAWINGS

Construction of the 'Lavatory Reservation Apparatus': The 'Lavatory Reservation Apparatus' comprises of four main parts—1) Central Computer System; 2) Lavatory Reservation Console; 3) Lavatory Door Lock; and 4) Lavatory Status Module.

Figure 1:
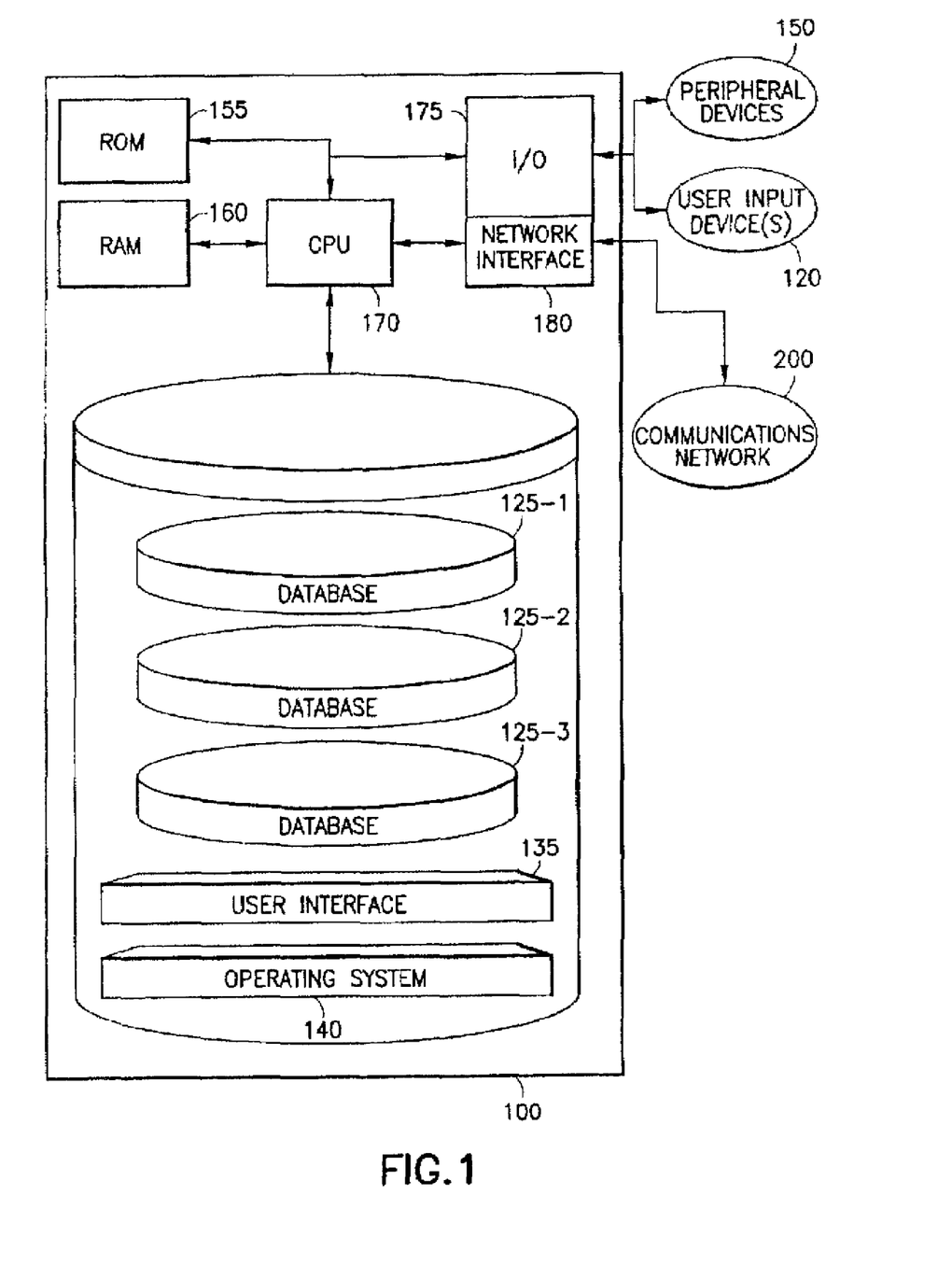
FIG. 1 illustrates the 'central computer system' according to one embodiment of the invention.
Figure 3:
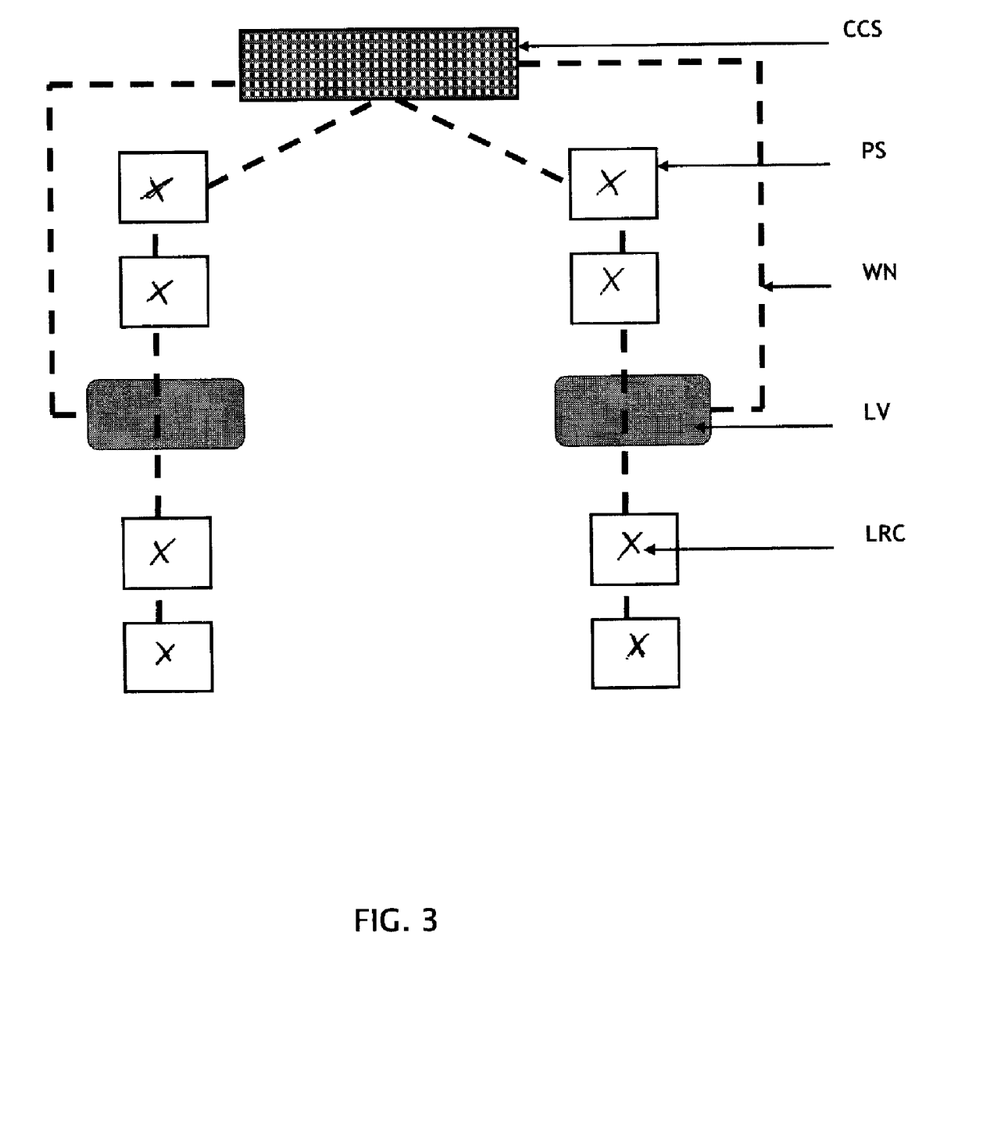
FIG. 3 illustrates the communication network between the 'central computer system' and other apparatuses and systems of the invention.

Central Computer System: The 'central computer system' (CCS) acts as a central controller and comprises of one or more computers programmed with 'lavatory reservation software'. FIG. 1 shows one embodiment of the 'central computer system' (CCS). In this embodiment, the central computer system 100 is configured to receive information from a communications network 200 through its input/output (I/O) facility 175, preferably, via a network interface 180. The I/O facility is capable of both receiving and sending information. Peripheral devices 150 may be attached to the 'central computer system' (CCS) for any number of purposes including, but not limited to: printers for output, scanners for input, additional or alternative storage devices for data storage and retrieval, network interfaces for communication, and devices of the like. Also, the 'central computer system' (CCS) may receive information from one or more users from user input device(s) 120. A typical 'central computer system' (CCS) may be based on common programmed computer systems that may include, but are not limited to, components such as: a central processing unit (CPU) 170; and various forms of memory such as, but not limited to: read only memory (ROM) 155, random access memory (RAM) 160, and a local storage device 110. The CPU is electronically coupled to each of the central computer system's other elements. The CPU comprises at least one high-speed data processor adequate to execute program modules for executing user or system-generated requests. Preferably, the CPU is a conventional microprocessor such as the Intel Pentium Processor. The CPU interacts with RAM, ROM, and storage device(s) to execute stored program code according to conventional data processing techniques. The local storage device may contain modules. These modules may include, but are not limited to, a user interface 135, an operating system 140, and database(s) 125. These modules may be stored and accessed from the local storage device(s) or from storage devices accessible through I/O. Although these modules typically and preferably are stored in a local storage device, they may also be stored in ROM, RAM, and peripheral devices or in remote storage facilities through a communications network. The operating system is executable program code enabling the operation of the 'central computer system' (CCS). The operating system facilitates access of storage devices, I/O, network interfaces devices, peripheral devices, etc. The operating system preferably is a conventional product such as the Unix operating system or Microsoft Windows NT. The operating system, once executed by the CPU, interacts with ROM, RAM, I/O, peripheral devices, user input devices, storage devices, communications networks, program modules, and data, et al. Preferably, the operating system includes communication protocols that allow the 'central computer system' (CCS) to communicate with other entities through a communications network. The preferable protocol is TCP/IP. All 'lavatory reservation consoles' (LRC), 'lavatory door locks' and 'lavatory status modules' are connected to the 'central computer system' (CCS) by a wired or a wireless network (WN), as shown in FIG. 3. The 'lavatory reservation software' enables the 'central computer system' (CCS) to; 1) accept lavatory reservation request from the 'lavatory reservation consoles' (LRC) and generate an access code in response to each such lavatory reservation request; 2) assign available lavatories to passengers in the order of their lavatory reservation requests; 3) inform passengers when a lavatory has been reserved for them; 4) receive and verify access codes entered in the 'lavatory status module'; 5) determine lavatory occupancy status based on input from the 'lavatory status module' and the operational status of the 'lavatory door lock'; and 6) operate 'lavatory door lock' in a way such as to restrict access to the lavatory only to an authorized passenger with a verifiable access code; and only at a time when the lavatory is reserved for the said passenger.

Figure 2:
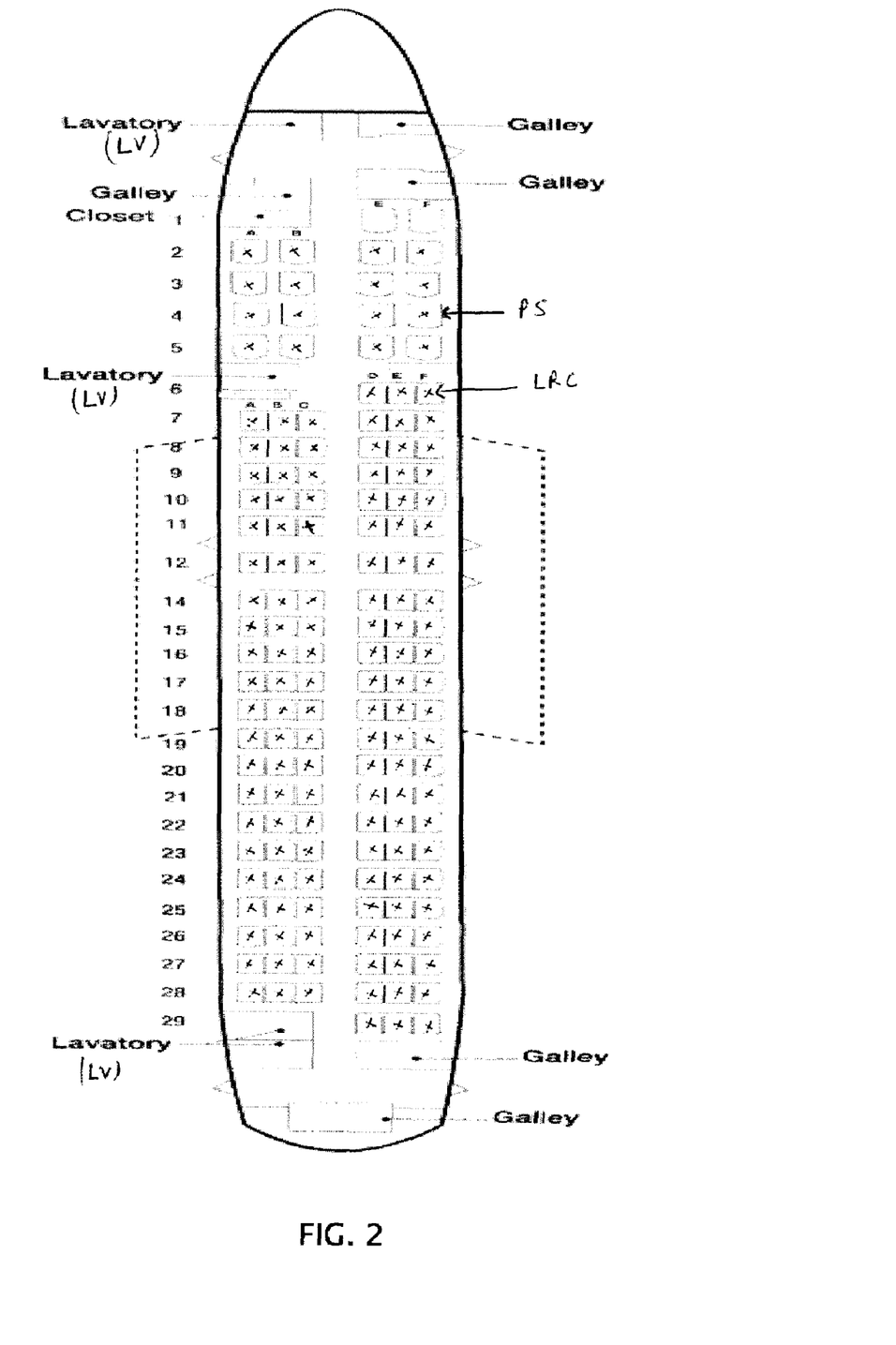
FIG. 2 illustrates the lay out of the passenger cabin in an airplane according to one embodiment of the invention; wherein a 'lavatory reservation console' is provided at each passenger seat.

Lavatory Reservation Console: A 'lavatory reservation console' (LRC) is provided on each passenger seat (PS) of an airplane; as shown in FIG. 2. According to the fist preferred embodiment, the 'lavatory reservation console' (LRC) is integrated with the entertainment console, which is commonly provided at passenger seats (PS) in most modern aircrafts. Such entertainment console usually comprises of an electronic display unit, on which passengers can watch movies and other entertainment programs. The entertainment console is also used by the crew to display other types of information such as flight map and play in-flight announcements. According to one embodiment, the 'lavatory reservation console' (LRC) is integrated with the entertainment console. Preferably, a touch screen is provided to enable passengers enter lavatory reservation requests into the 'central computer system' (CCS). Alternatively, a voice recognition application can be used for this purpose. Preferably an audio output means such as speakerphone and an audio input means such as microphone are provided in the 'lavatory reservation console' (LRC). Each 'lavatory reservation console' (LRC) is connected to the 'central computer system' (CCS) by a wired or a wireless network (WN) as shown in FIG. 3. According to another embodiment, the 'lavatory reservation console' (LRC) comprises of a 'lavatory reservation switch' and 'indicator light' integrated into passenger seats (PS); like many other present functions—flight attendant request, lighting, fan etc. Activation of the 'lavatory reservation switch' sends lavatory reservation request to the 'central computer system' (CCS); and the 'indicator light' informs the passenger when a lavatory has been reserved in response to his/her lavatory reservation request. According to another method, lavatory reservation request can be communicated to the 'central computer system' (CCS) via telephone or computer. In all embodiments of the invention, the 'lavatory reservation console' (LRC) is connected to the 'central computer system' (CCS) by means a wired or wireless network (WN) as shown in FIG. 3, which enables two-way communication between the two.

Lavatory Door Lock: Each lavatory (LV) of the airplane is equipped with a 'lavatory door lock'. 'Lavatory door lock' is connected to the 'central computer system' (CCS) by wired or wireless network (WN) as shown in FIG. 3. The operational status of 'lavatory door lock' (locked or unlocked) is communicated to the 'central computer system' (CCS) at all times. Preferably, 'lavatory door lock' is provided with means for automatic operation by the 'central computer system' (CCS). In addition to having means for automatic operation, 'lavatory door lock' is provided with actuators to enable manual operation. Locking systems with means for remote and automatic operation have been described in prior art and are employed in many systems currently in use; such as home security systems. 'Lavatory door lock' is programmed to remain in a locked position while the lavatory door remains in closed position. Preferably, means is provided for lavatory door to close automatically after it has been left open for a pre determined period of time. This will ensure that the lavatory door remains locked at all times except when a passenger's entry or exit is expected. The operation of the 'lavatory door lock' is designed a way such that it restricts access to a lavatory only to an authorized user with a verifiable access code; and at a time when the lavatory is reserved for the said user.

Lavatory Status module: The 'lavatory status module' comprises of an input means such as an electronic display unit, preferably with a touch screen, located both on outside and inside of the lavatory door. In addition, it comprises of a speakerphone and a microphone which serve as audio output and audio input means respectively. The 'lavatory status module' is connected to the 'central computer system' (CCS) by wired or wireless network (WN) as shown in FIG. 3. The touch screen on the outside electronic display unit provides passengers means to enter their access code. A manual keyboard can instead be provided for this purpose. Alternatively, this can be accomplished by providing a voice recognition application wherein passengers can speak their access code into the system. The access code is subsequently communicated to the 'central computer system' (CCS) for verification. Successful operation of the 'lavatory door lock' is dependent upon input of correct access code by user at a time when it is his or her turn to use the lavatory. In addition to or in lieu of access codes, other identification methods such as facial recognition, retinal recognition etc. can be used. The inside electronic display unit of the 'lavatory status module' provides means to the occupant of the lavatory (LV) to enter his/her status when he/she is done using the lavatory (LV), which is then communicated to the 'central computer system' (CCS). This enables the 'central computer system' (CCS) to update the status of the lavatory (LV) as 'available' and unlock the 'lavatory door lock' automatically to enable the occupant to exit. In a situation when the occupant manually unlocks the lavatory door lock from inside, a signal is communicated to the 'central computer system' (CCS) to update the status of the lavatory (LV) as 'available'. In addition, the status of the lavatory (LV) is determined to be 'available' when the 'lavatory door lock' has remained unlocked for a pre determined period of time. Occupancy status of the lavatory (LV) can also be determined by sensors, such as heat sensor; motion sensor and the like that can be mounted in the lavatory (LV) or at any other convenient place in an airplane. Furthermore, occupancy status of the lavatory (LV) can be determined by a camera mounted in the lavatory (LV) or at any other convenient place in the airplane. The lavatory occupancy status can also be determined by the position (open or close) of the lavatory door.

Figure 4:
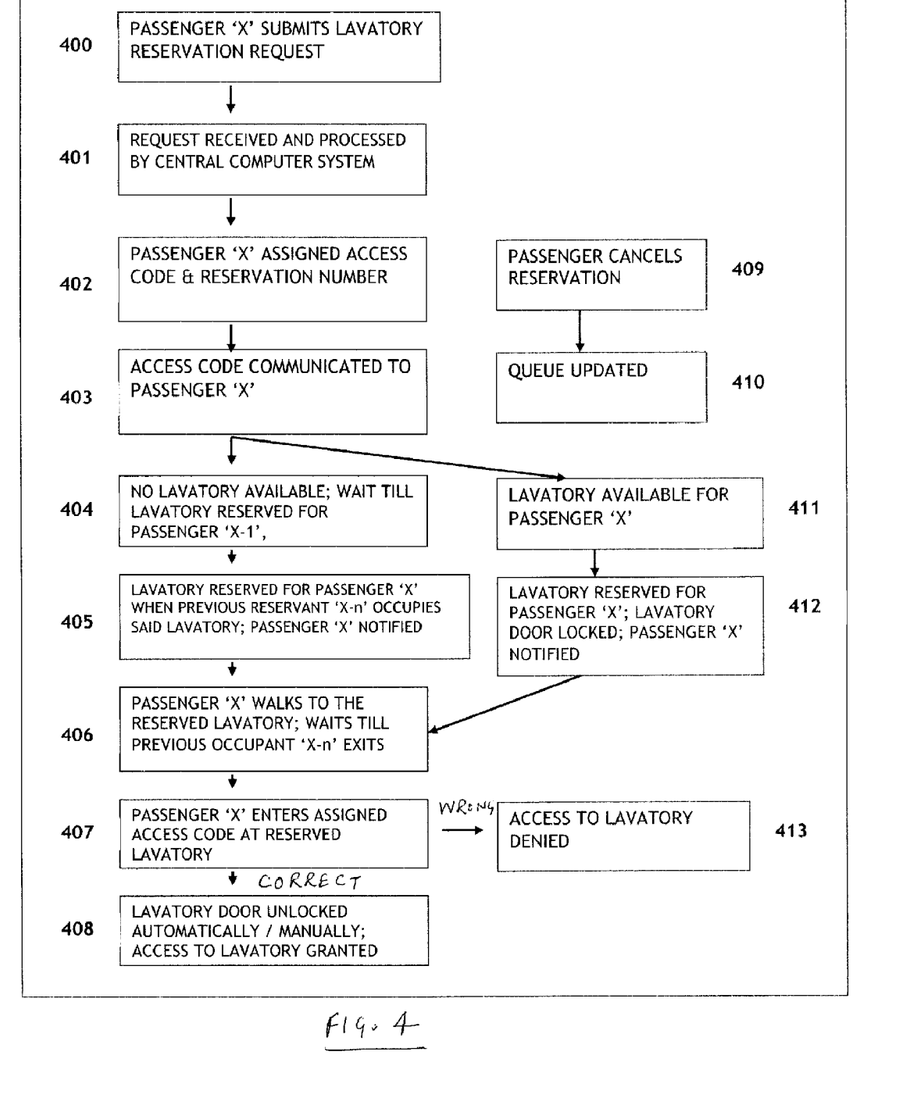
FIG. 4 is a flow chart illustrating execution of a lavatory reservation request according to one embodiment of the invention.
Figure 5:
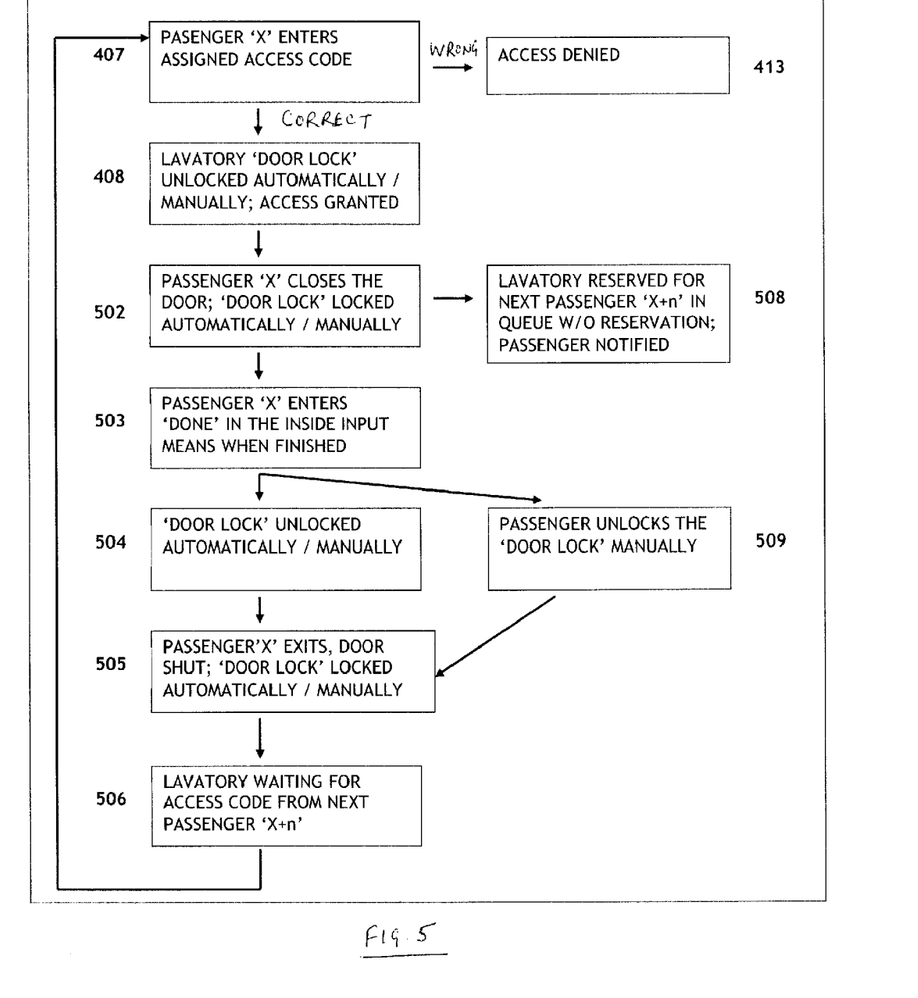
FIG. 5 is a flow chart illustrating the operation of the 'lavatory door lock' according to one embodiment of the invention; wherein the 'lavatory door lock' allows restricted access to the lavatory. It further illustrates execution of a lavatory reservation request according to one embodiment of the invention.

Operation of the Lavatory Reservation System:

An algorithm for operation of the lavatory reservation system is shown in FIGS. 4&5. Lavatory reservation request 400 is made at the 'lavatory reservation console' (LRC); and is thereafter communicated 401 to the 'central computer system' (CCS). In the first preferred embodiment of the 'lavatory reservation console' (LRC), lavatory reservation request 400 is made by selecting the 'reserve lavatory' option from the menu of choices displayed on the electronic display unit under the 'lavatory reservation' function. In the second preferred embodiment of the 'lavatory reservation console' (LRC), lavatory reservation request is made 400 by activating the 'lavatory switch' located on the passenger seat. Upon receipt of a lavatory reservation request, the 'central computer system' assigns an access code and a reservation number to each such request 402; and communicates the access code to the passenger making the lavatory reservation request 403. Preferably, the access code is displayed on the electronic display unit of the 'lavatory reservation console' at the corresponding passenger seat (PS). Alternatively, access code can be any other unique identifier associated with passengers such as ticket number, phone number, social security number, frequent flier account number and the like. The 'central computer system' (CCS) stores a list of all lavatory reservation requests. Each passenger seat (PS) on the airplane is assigned a preferred set of lavatories (LV) based on their proximity. In response to a lavatory reservation request, the 'central computer system' (CCS) is programmed to allot a lavatory (LV) from the preferred set of lavatories (LV) assigned to the said passenger seat (PS). Optionally, more than one preferred set of lavatories (LV) can be assigned to a passenger seat (PS) in a rank order of proximity. In this situation, the 'central computer system' (CCS) is programmed to assign a lavatory (LV) from a subsequent preferred lavatory set should a lavatory from the preferred lavatory set is not available after the lapse of a predetermined time period. The preferred lavatory assignment achieves three purposes; 1) ensures equal distribution of lavatories (LV) among the passenger seats (PS); 2) enables the 'central computer system' (CCS) to preferably assign a lavatory (LV) closest to a passenger seat (PS) in response to a lavatory reservation request; and 3) prevents passengers from one cabin class from using the lavatory (LV) of another cabin class. Once a lavatory reservation request is received by the 'central computer system' (CCS) it assigns the said request to the preferred lavatory set. It further sorts the lavatory reservation request for each preferred lavatory set in the order in which the said requests are received 401. The system can be programmed to take urgent requests from passengers, especially children and the elderly. It can also be programmed to give priority to lavatory reservation requests made by crew members. When a lavatory reservation request moves up to a pre determined position, the 'central computer system' (CCS) reserves the lavatory and sends a 'reserve' notice to the corresponding passenger 405. In a situation when a lavatory is available immediately 411, the lavatory is reserved and the said passenger is notified 412. In a situation when all lavatories are occupied and reserved 404, the system waits till a lavatory has been reserved for the preceding passenger404. The next unreserved lavatory is reserved for the passenger when the previous reservant of the said lavatory has occupied the lavatory 405. The passenger is then notified of the reservation 405. The reservation notice is preferably displayed on the electronic display unit of the 'lavatory reservation console' (LRC) of the corresponding passenger seat (PS). Alternatively, it can be played as an audio message at the 'lavatory reservation console' (LRC) using speakerphones as the audio output means. Passengers can also receive the reservation notice through a telephone call in which the information may be provided in a pre-recorded message. Each lavatory (LV) in the airplane is assigned a unique ID; and the ID of the available lavatory (LV) is communicated to the passenger at the same time as the reservation notice. A passenger may cancel his or her reservation at any time if desired. A passenger may cancel a reservation 409 by using the 'lavatory reservation console' (LRC) on his seat by selecting 'cancel' command on the electronic display unit. Upon receiving the cancellation request 409, the central computer system (CCS) updates the queue by removing the reservation from the queue 410. If a reservation is not cancelled, the central computer system (CCS) notifies the passenger when a lavatory has been reserved for him or her 405.

Once 'reserved' notice is communicated to a passenger 405, he or she is given an option to accept or decline the reservation. If accepted, the reserved lavatory waits for a predetermined period of time for the passenger. During this time, the passenger walks to the assigned lavatory (LV) and waits for the previous occupant to exit 406. If the previous occupant exits the lavatory (LV) prior to the arrival of the next passenger, the lavatory door remains locked and waits for the passenger for a pre determined period of time. Upon arrival at the lavatory, the passenger is asked to enter his or her assigned access code 407 in the 'outer display unit' of the 'lavatory status module' using the touch screen/keypad provided therein. Alternatively, this can be done using a voice recognition application. If the lavatory is still occupied when the passenger arrives at the lavatory, he or she is asked to wait outside. When the previous occupant exits the lavatory, the passenger is asked to enter his or her assigned access code 407 in the 'outer display unit' of the 'lavatory status module' using the touch screen/key pad provided therein. Alternatively, this can be done using a voice recognition application. The access code is communicated to the 'central computer system' (CCS) for verification. Upon verification of the access code, the 'lavatory door lock' is automatically (or manually) unlocked and the passenger is allowed access into the lavatory 408. If incorrect access code is entered, access to lavatory is denied 413. Once inside, the passenger shuts the door and the 'lavatory door lock' is automatically (or manually) locked 502. The locking of the 'lavatory door lock' at this time also serves as an indication to the 'central computer system' (CCS) to reserve the lavatory (LV) for the next passenger in queue for whom a lavatory has not yet been reserved 508; and a 'reserved' notice is sent to the said passenger 508. The intent here is to provide enough time to the next passenger to walk to the lavatory (LV) while, at the same time keeping the line outside of the lavatory (LV) to a minimum. Preferably, the previously entered access code remains active until the next access code is entered. Even if the passenger in the lavatory (LV) comes out, he or she will be able to get back in the lavatory (LV) by re entering his or her access code, provided that the next passenger has not entered his or her access code. This is to enable a passenger to come out of the lavatory in case of compelling situations without risking loosing his or her lavatory reservation. The 'central computer system' (CCS) locks the 'lavatory door lock' only if correct access code was entered. In the event of an unauthorized entry into a lavatory, the 'lavatory door lock' will not lock. This will compel the unauthorized occupant to exit the lavatory. In addition, an alarm can be activated when an unauthorized entry is detected which will serve as an additional deterrent against unauthorized entry.

The 'lavatory door lock' is preferably an automatic lock with additional means for manual operation in the form of an 'outside actuator' and 'inside actuator'. It is preferably operated automatically by the 'central computer system' (CCS) with a back up means for manual operation. Preferably, means is also provided to keep the lavatory door shut at all times except for when passenger's entry or exit is expected. The 'lavatory door lock' remains in a locked position in the absence of a pending lavatory reservation request and after exit of an occupant 505. Once a passenger enters the correct access code at a time when the lavatory is reserved for him or her, the 'central computer system' (CCS) unlocks the 'lavatory door lock' 408. Once inside the lavatory, passenger shuts the lavatory door where after the 'central computer system' (CCS) locks the 'lavatory door lock' 502. For additional safety and privacy of the occupying passenger, an additional lock is provided on the inside of the lavatory door which can be optionally manually engaged. This lock is operated entirely by the occupying passenger manually and not by the central computer system (CCS). During the time when the lavatory (LV) is occupied by the passenger 'Occupied' message is displayed on the outside display unit of the 'lavatory status module'; and no access codes can be entered during this time. The 'lavatory status module' also has an 'inside display unit' on the inside of the lavatory door. The 'inside display unit' has input means, preferably a touch screen display. The 'inside display unit' achieves two main purposes; 1) display the status of the 'lavatory door lock' to the occupant; and 2) provide the occupant means to communicate to the 'central computer system' (CCS) when he/she is finished using the lavatory by choosing the option 'DONE' on the 'inside display unit' 503; where after the 'central computer system' (CCS) unlocks the 'lavatory door lock' enabling the passenger to exit from the lavatory 504. The passenger preferably also has the option to exit the lavatory by unlocking the automatic lavatory lock manually 509 (and by unlocking the additional lock if it was engaged earlier). When the lavatory door shuts after exit of the occupying passenger 505, the 'central computer system' (CCS) locks the 'lavatory door lock' 505 and displays the 'available' sign on the 'outside display unit'. At this time, the 'lavatory status module' is ready to accept access code from the next passenger for whom the said lavatory has been reserved 506. In case of malfunction, the 'lavatory door lock' and the 'central computer system' (CCS) can be reset by the crew using a unique password. In the preferred method, the 'central computer system' (CCS) is programmed to reserve the lavatory (LV) and send a 'reserved' message to the next passenger in queue when the 'lavatory door lock' is locked after lavatory (LV) is occupied by the preceding passenger 502, 508. This will give ample time to the next passenger to walk to the lavatory (LV); and at the same time keep the line outside the lavatory to a minimum. The system can be programmed to give extra time for the elderly, disabled and children. If the 'central computer system' (CCS) does not receive the next access code within a predetermined time period after a lavatory (LV) becoming available, the corresponding reservation is cancelled and the lavatory (LV) is reserved for the next passenger in queue for whom a lavatory (LV) has not yet been reserved.

In addition to monitoring the status of the lavatory and the movement of passengers, the 'central computer system' (CCS) may also monitor the status of the airplane. For example, when the airplane encounters unusual turbulence in the air, the 'central computer system' (CCS) may temporarily halt the lavatory (LV) use by withholding notifications to passengers who have made reservation for lavatory use. The 'central computer system' (CCS) may also lock the 'lavatory door lock' and notify passengers in waiting to stay seated in their respective seats until further notice. Likewise, the 'central computer system' (CCS) may halt the lavatory use during landing and take-off of the plane. The lavatory reservation system of the invention has other potential benefits. It can help airline staff determine lavatory usage on a given route and accordingly supply the lavatory. It can be programmed to can alert the crew when a pre determined number of passengers have used a lavatory so the lavatory supplies can be replenished. It can alert the crew when a passenger has been in the lavatory for longer than a specified time period, which may suggest that the occupant may be having a medical emergency like heart attack or stroke. Passengers sometimes forget their personal belongings in the lavatory. The system can be used to send an alert to all passengers who have used a given lavatory of any items left behind.

It is understood that the lavatory reservation system of the invention can be used in places other than an airplane. Airplane has been used for illustration purposes only and should not be considered limiting in any way. For example, the reservation system can be used for managing lavatory use on other means of public transport such as train, bus, ship etc. where similar concerns exist. The invention could also find use in places of public gathering such as restaurants, theaters, stadiums etc. where lavatory access is limited. Although lavatory has been used in the invention for illustration purposes and should be considered limiting as the invention is also capable of being applied to restrooms, bathrooms etc. It is also to be understood that the lavatory reservation system of the invention can also be used to implement a reservation system at other places of public use such as reserving a dinner table; reserving and controlling access to places such as theaters, stadiums, gymnasiums, restaurants etc; especially in places such as cruise ship. The invention is capable of other embodiments and of being practiced and carried out in various ways. As such, those skilled in the art will appreciate that the conception, upon which this disclosure is based, may readily be utilized as a basis for the designing of other structures, methods and systems for carrying out one or several purposes of the present invention. It is important, therefore, that the claims be regarded as including such equivalent constructions insofar as they do not depart from the spirit and scope of the present invention.

I claim:

1. A lavatory reservation system comprising of; 1) assigning lavatory set to user among multiple lavatories in a facility according to user location in the facility; 2) lavatory reservation request input means; 3) lavatory door lock having means to restrict access to the lavatory based on set of rules; operatively connected to controller; and having input means; 4) a controller; 5) a monitoring device coupled to the controller and adapted to monitor occupancy of a lavatory; 6) computer program code operative with the controller enabling the controller to: receive a request to use lavatory from user; enter user in queue in assigned lavatory set according to set of rules; assign access code for lavatory reservation request; notify user of lavatory status; automatically operate lavatory door lock from second unlocked to first locked position upon lavatory door changing from first open to second closed position subsequent to entry of valid access code into corresponding lavatory door input means.

2. The lavatory reservation system of claim 1;
wherein lavatory reservation request input means comprises of electronic display unit.

3. The lavatory reservation system of claim 1;
wherein lavatory reservation request input means comprises of a mechanical switch.

4. The lavatory reservation system of claim 1;
wherein lavatory reservation request input means comprises of a voice recognition application.

5. The lavatory reservation system of claim 1;
wherein the lavatory reservation request input means is operatively connected to the controller.

6. The lavatory reservation system of claim 1;
wherein the computer program code further comprises of means to assign lavatory access code to users in queue to use lavatory.

7. The lavatory reservation system of claim 1;
wherein lavatory door lock is operatively connected to the controller.

8. The lavatory reservation system of claim 1;
wherein the lavatory door lock has means to restrict access according to lavatory access code.

9. The lavatory reservation system of claim 1;
wherein lavatory access code input means is provided at lavatory.

10. The lavatory reservation system of claim 1;
wherein lavatory access code input means comprises of an electronic display unit.

11. The lavatory reservation system of claim 1;
wherein lavatory access code input means comprises of voice recognition application.

12. The lavatory reservation system of claim 1;
wherein lavatory access code input means is operatively connected to the controller.

13. An airplane lavatory reservation system comprising of 1) controller; 2) lavatory door lock operatively connected to controller; 3) lavatory reservation request input means; 4) controller having means to assign lavatory access code to users making lavatory reservation request; 5) controller having means to process lavatory reservation requests based on a set of rides; 6) computer program code operative with the controller having means to move the lavatory door lock from first default unlocked position to second locked position subsequent to processing of lavatory reservation request; and move the lavatory door lock from second locked position to first unlocked position upon entry of a valid access code.

14. A lavatory reservation system comprising of; 1) lavatory reservation request input means; 2) controller having means to assign lavatory access code to users making lavatory reservation request; 3) controller having means to process lavatory reservation requests based on a set of rules; 4) lavatory access code input means at lavatory; and 5) lavatory door lock operatively connected to controller and controller having means to restrict lavatory door lock going from first unlocked position into second locked position until input of valid lavatory access code; and furthermore having means to move lavatory door lock from first unlocked to second locked position upon corresponding door going from first open to second closed position subsequent to entry of valid access code.

15. The lavatory reservation system of claim 14; further comprising of lavatory door lock having means to restrict access until input of valid lavatory access code.

16. A lavatory reservation system comprising of; 1) lavatory reservation request input means; 2) controller assigning lavatory access code to user in response to lavatory reservation request; 3) controller assigning lavatory set to user according to user's location in facility; 4) controller reserving a lavatory among assigned lavatory set for corresponding user when lavatory in assigned lavatory set becomes available; 5) controller notifying corresponding user when a lavatory has been reserved; and 6) controller restricting access to the reserved lavatory until valid lavatory access code entered within specified time period; 7) locking means for the lavatory door upon closure of the lavatory door subsequent to valid access code entry into lavatory door input means; and 8) activation of locking means providing input to controller to process next lavatory reservation request.

17. The lavatory reservation system of claim 16; further comprising lavatory access code input means at lavatory.

18. The lavatory reservation system of claim 16; further comprising lavatory door lock automatically operable by controller upon input of lavatory access code.

* * * * *